Dec. 7, 1948.　　　　　A. KONRAD　　　　　2,455,587
MOTOR VEHICLE CARRYING CASE

Filed Dec. 23, 1947　　　　　　　　　　2 Sheets-Sheet 1

Alexander Konrad
INVENTOR

BY C. A. Snow & Co.
ATTORNEYS.

Dec. 7, 1948.    A. KONRAD    2,455,587
MOTOR VEHICLE CARRYING CASE
Filed Dec. 23, 1947    2 Sheets-Sheet 2

Alexander Konrad
INVENTOR
BY *CASnow&Co.*
ATTORNEYS.

Patented Dec. 7, 1948

2,455,587

UNITED STATES PATENT OFFICE 2,455,587

MOTOR VEHICLE CARRYING CASE

Alexander Konrad, Cleveland, Ohio

Application December 23, 1947, Serial No. 793,338

2 Claims. (Cl. 224—42.42)

1

This invention relates to carrying cases, the primary object of the invention being to provide carrying cases, which are so constructed and arranged that when properly positioned they will fit together in such a way as to completely fill the rear luggage compartment of a motor vehicle, utilizing the entire space.

An important object of the invention is to provide carriers of this character which may be folded into small and compact articles for shipment or transportation and which may be opened or extended to provide compartments or containers for articles.

Another object of the invention is to provide cases which are absolutely dust-proof and which have securing flaps formed along one of their longitudinal edges, the securing flaps providing means for holding the various case sections together against movement while in transit or while positioned within the luggage compartment of the vehicle.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
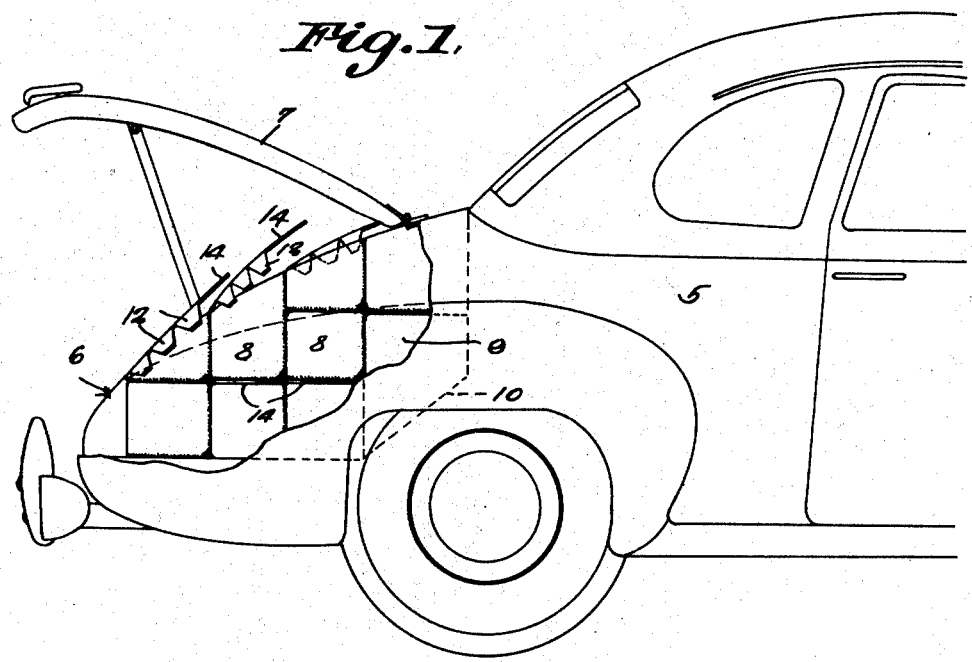
Figure 1 is a fragmental elevational view illustrating the rear end of a vehicle with the cover of the luggage compartment of the vehicle open, the case sections being shown positioned therein.
Figure 2:
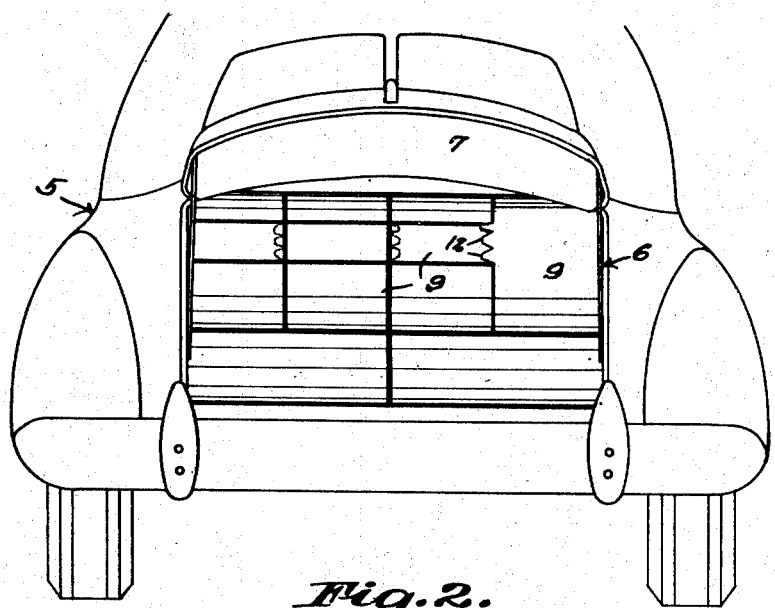
Fig. 2 is a rear elevational view of the luggage carrier of a vehicle with the compartments of the case mounted therein.

Referring to the drawings in detail, the reference character 5 indicates a motor vehicle body which is provided with the usual luggage carrier 6, normally closed by means of the closure 7.

The present invention embodies the provision of a plurality of units, each unit embodying a casing 8, the upper edges thereof being curved so that when the units are positioned within the luggage carrier, the curved upper surfaces of the units will provide a continuous curved surface conforming to the curvature of the closure 7, so that the closure will fit thereover and hold the various units in their proper positions with respect to each other. It will, of course, be understood that these units will be constructed in such a way that they will when assembled, conform to the interior shape of the luggage carrier. For example, the innermost unit or casing 9 has a lower inclined wall 10 to fit against the usual inclined surface of the inner end of the luggage carrier.

A cover indicated at 11 is formed as a part of each unit or casing and is provided with tabs 12 that extend downwardly from the cover, the tabs permitting of the proper bending of the cover to conform to the curved upper surfaces of the units. These tabs also prevent lateral movement of the covers with respect to the main portions of the units.

Flanges 13 are formed on the units so that when the units are folded the flanges 13 will overlie each other in such a way as to provide the bottom for the unit.

Retaining flaps 14 are formed on each unit, the flaps being so arranged that they will fall between units and when the units are pressed together, the retaining flaps will be clamped between the units or casings, thereby holding them against movement with respect to each other.

Figure 3:
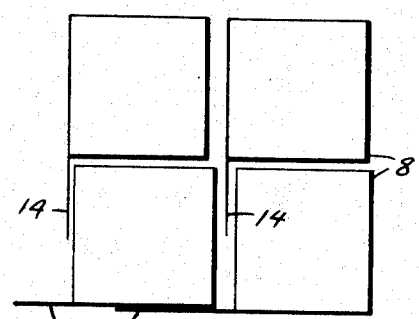
Fig. 3 is an end elevational view illustrating a plurality of units as positioned prior to fitting them together.
Figure 4:
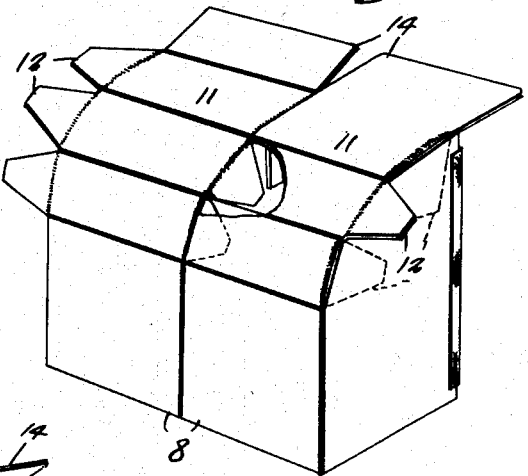
Fig. 4 is a perspective view illustrating the covers of the units as partially open.
Figure 5:
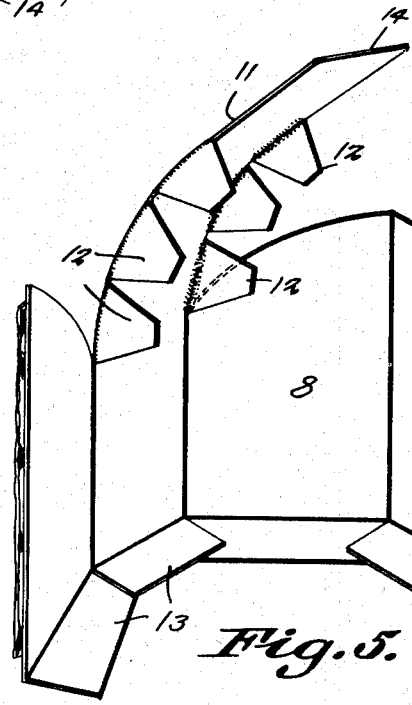
Fig. 5 is a perspective view illustrating one of the units in semifolded condition.
Figure 6:
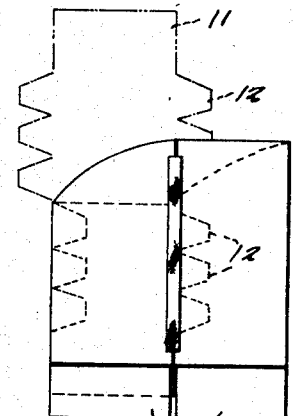
Fig. 6 is a view illustrating a unit in folded position.

As clearly shown by Fig. 3 of the drawings, the flaps 14 on the lower casings or units, are extended along the bottom of the luggage carrier in which they are positioned, and the adjacent casings or units rest thereon, the weight of the casings or units and articles contained therein, holding the sections against movement with respect to each other.

From the foregoing it will be seen that due to the construction shown and described, it is possible to provide a set of units which are so designed that when properly positioned within a luggage carrier of a predetermined car, a close fit will be provided and the entire space of the luggage carrier may be utilized and one unit may be removed without disturbing another unit, making it possible for the removal of certain units that contain certain materials.

It will, of course, be necessary to reconstruct the various units for the various type cars, so that when they have been properly positioned they will completely fill the luggage carrier space.

Having thus described the invention what is claimed is:

1. Carrying cases for positioning in the luggage carrier of a motor vehicle having a curved closure, comprising a plurality of case units adapted for fitting within the luggage carrier one upon another completely filling the luggage carrier space, an extension of the casing of each unit forming a retaining flap, certain of said retaining flaps being positioned between adjacent units holding the units against movement with respect to each other.

2. Carrying cases for positioning in the luggage carrier of a motor vehicle having a curved closure, comprising a plurality of case units, each of said case units embodying a foldable box-like member, said box-like members being positioned within the luggage carrier space completely filling the luggage carrier space, a retaining flap carried by each unit, each retaining flap being extended beyond its unit and clamped between an adjacent unit and a juxtaposed bearing surface.

ALEXANDER KONRAD.

REFERENCES CITED

The following references are of record in the file of this patent:

UNITED STATES PATENTS

| Number | Name | Date |
|---|---|---|
| 1,331,862 | Claus | Feb. 24, 1920 |
| 2,068,763 | Powell | Jan. 26, 1937 |
| 2,396,010 | Isenberg | Mar. 5, 1946 |

FOREIGN PATENTS

| Number | Country | Date |
|---|---|---|
| 661,511 | France | Mar. 5, 1929 |